July 19, 1938.  D. H. MONTGOMERY  2,124,167
CAM MEANS
Filed June 13, 1936
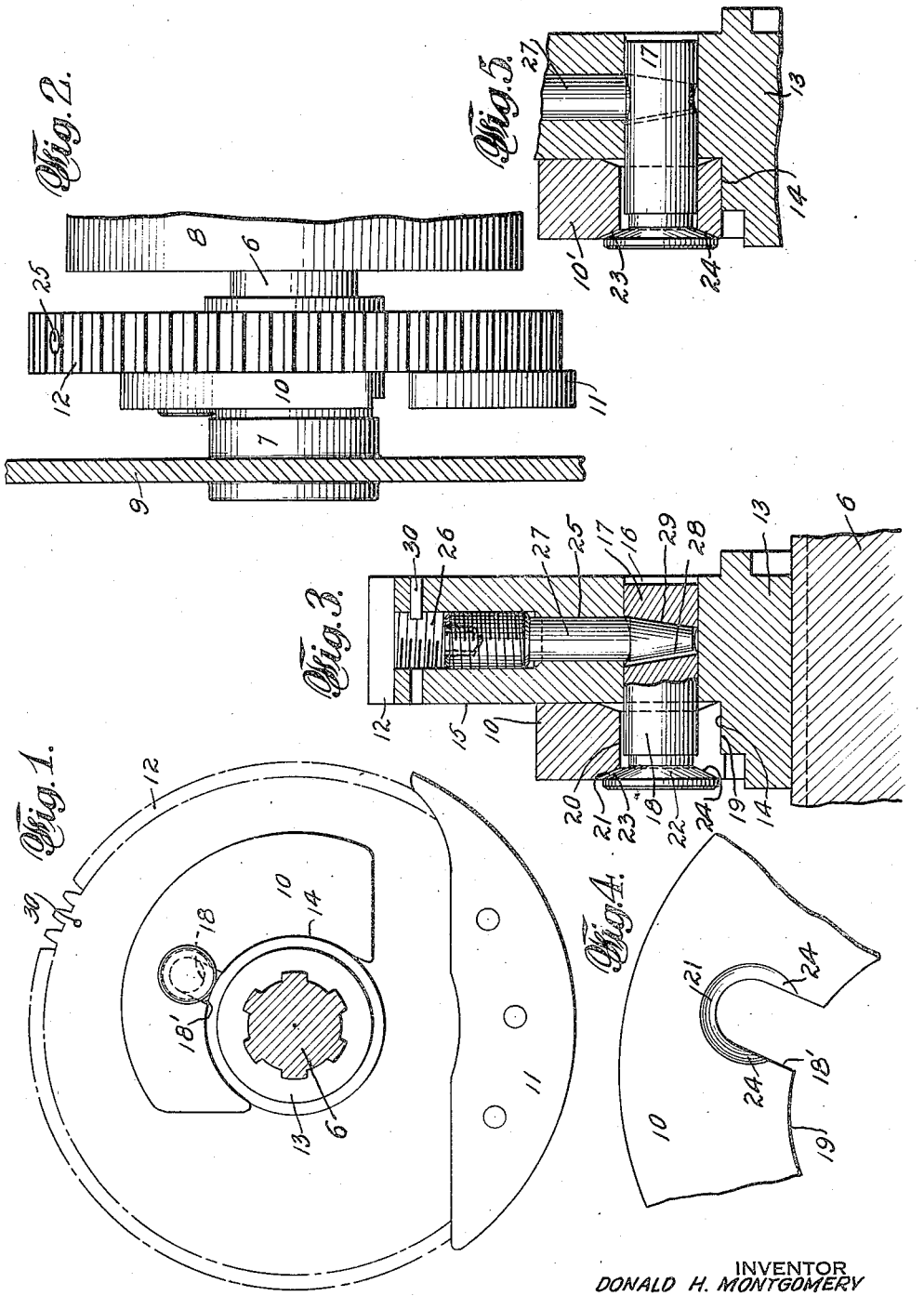
INVENTOR
DONALD H. MONTGOMERY
BY
Mitchell Bechert
ATTORNEYS.

Patented July 19, 1938

2,124,167

UNITED STATES PATENT OFFICE 2,124,167

CAM MEANS

Donald H. Montgomery, West Hartford, Conn., assignor, by mesne assignments, to The New Britain Machine Company, New Britain, Conn., a corporation of Connecticut Application June 13, 1936, Serial No. 84,985

11 Claims. (Cl. 74—567)

My invention relates to cam means and more particularly to means for securing a cam or the like to a disk, drum, gear or other support.

It is an object of the invention to provide means for securing a cam to its support, which will very securely hold the cam and which is readily accessible for cam changing.

It is another object to provide a generally improved means for securing a cam or the like to its support.

It is another object to provide improved means for securing a cam to its support and in so doing urge the cam and support into tight fitting engagement with supporting surfaces at substantially right angles to each other.

Another and more specific object is to provide cam securing means in a cam supporting disk or gear, accessible from the peripheral surface of the disk or gear for cam changing, adjustment, etc.

Other objects and features of invention will be pointed out or will become apparent to those skilled in the art.

In the drawing which shows, for illustrative purposes only, preferred forms of the invention—

Fig. 1 is a view in side elevation of a gear or disk support for a cam showing a cam in place thereon and the shaft carrying said disk in section;

Fig. 2 is an edge view of parts shown in Fig. 1 and illustrating a shaft mounted in a support or supports;

Fig. 3 is an enlarged sectional view through the gear, cam and cam supporting means and illustrating the operation of the improved holding means and one form of cam;

Fig. 4 is an enlarged fragmentary view of the cam shown in Figs. 1 and 3; and

Fig. 5 is a fragmentary view similar to Fig. 3 and illustrating a different form of cam.

In said drawing 6 indicates a shaft, which may be the main or an auxiliary cam shaft of, say, an automatic screw machine. The shaft may be mounted in a bearing 7 in a wall of the machine and may be mounted in a support 8 which, however, might comprise a cam drum and the shaft 6 may be mounted at the right hand end in another support, not shown. The cam support is mounted intermediate the supporting walls 9 and the cam drum or support 8 and cams 10—11 are carried by the face thereof. The cam support may be of any suitable form, such as a supporting disk, and as illustrated is in the form of a gear 12, which may be driven and serve as the drive for the shaft 6. In the particular mounting of Fig. 2 it will be noted that there is very little room between the gear faces and the wall 9 and the cams 10—11 are mounted in that relatively small space. I provide improved means to readily permit the cam, such as 10, to be secured to the face of the gear 12 and be held with great security. Where there is a greater space between the gear face 12 and the wall 9 the form illustrated in Fig. 5 may, if desired, be employed.

As illustrated the gear 12 is provided with a substantial hub 13 on the shaft and the hub has a circumferentially extending surface 14 at substantially right angles to the face 15 of the gear. A cam, such as the cam 10, has an internal circumferential surface fitting the surface 14, as shown in Figs. 1 and 3, and the side face of the cam fits the side face 15 of the gear. My invention relates particularly to a means for holding the cam to the gear.

In the form illustrated the gear 12 is provided with a transverse hole 16, into which is fitted a clamping member specifically shown as a stud or bolt 17. The cam 10 has an open-sided hole or slot 18' therein, of a size to fit over the projecting portion 18 of the stud 17 and the slot is preferably of such a depth that when the inner circumferential surface 19 thereof is in engagement with the hub of the gear the bottom of the slot will just contact or be slightly spaced away from the projecting portion 18 of the stud, as indicated at 20. The slot, if of the depth indicated, is provided at the bottom with a countersunk portion 21 and the stud 17 is provided with a head having a tapered surface 22 corresponding in form generally to the surface of the countersink 21. It will be seen that, with the head positioned over the countersink 21, when the stud 17 is moved toward the right as viewed in Fig. 3 the top portion of the countersink and the corresponding portion of the tapered head will be spaced slightly from each other, as indicated at 23, while that portion of the countersink below the generally horizontal diameter thereof will be in engagement with the lower part of the taper on the head, as indicated at 24. Thus the cam 20 will be urged or wedged downwardly by the tapered countersink and the tapered head until the circumferential surface 19 is rigidly supported on the hub at its surface 14. At the same time drawing the stud 17 inwardly will force the side face of the cam 10 into tight engagement with the face 15 of the gear.

The stud 17 in the preferred form is urged inwardly to secure the cam in place, by means accessible and operable from a peripheral portion of the gear. In the form illustrated the gear is provided with a generally radial hole 25 or at least a hole extending from the peripheral portion of the gear into the transverse hole 16. The hole 25 is counterbored and threaded, as indicated at 26, and a pin 27, having a hollow end for engagement by a wrench, is screw threaded into the threaded bore 26 and the end projects into the opening 16. The end of the pin 27 is tapered, as shown at 28, and the stud 17 is provided with a tapered surface 29, which may be one side of a tapered opening drilled transversely through the stud 17 but preferably of a diameter larger than the diameter of the pin 27, so that when the pin 27 is screwed downwardly the tapered surface will engage the right hand tapered abutment surface 29 and draw the stud 17 toward the right to its maximum extent to clamp the cam 10 in place.

When it is desired to remove the cam 10 the hollow nut opening of pin 27 is engaged by a suitable wrench and backed off so as to permit the stud 17 to move toward the left and upon relatively slight movement of the stud 17 toward the left the cam 10 may be slipped off of the part 18 of the stud without the necessity of completely removing the stud 17. A new cam having an open sided hole or slot, as 18', may be put in place and the pin 27 again screwed down to secure the cam very rigidly in place against its two supporting surfaces, namely, the surfaces 14—15.

In order to prevent the pin 27 from accidentally backing out and interfering with the proper operation of the gear at such time as the pin may be in place but no cam on the gear, I may provide means, such as a pin 30, projecting into the opening 25 a distance sufficient to prevent the pin 27 from backing out.

In that form of the invention shown in Fig. 5 which may be used when there is sufficient space between a wall, such as 9, and the face 15 of the gear, all parts may be substantially the same as those heretofore described and the same reference characters have been applied thereto. However, in the form shown in Fig. 5 the cam 10' is provided, not with an open sided hole or slot 18' but with a circumferentially continuous hole extending therethrough instead of an open-sided hole, as shown in Fig. 4. In the form shown in Fig. 5 the tapered head on the stud 17 engages substantially half of the circumference of the countersink in the cam and urges the cam down into engagement with the supporting surface more forcibly than when the open-sided hole or slot is employed. When it is desired to remove the cam 10' the pin 27 must be backed off sufficiently far to free the stud 17 and permit the latter to be removed from the gear. Use of the form shown in Fig. 5 would necessitate possibly a shorter pin 27 to permit a sufficient backing out of the pin to completely clear the stud 17.

It will thus be seen that I have provided means for very simply yet very readily and securely securing a cam to a cam support, such as a cam disk. Unless otherwise stated the term "hole" in the cam as used in the claims is intended to define an open sided hole or slot, as 18', as well as a circumferentially continuous hole, as shown in Fig. 5.

The parts are readily accessible and cam changing is very quickly effected. If cams are to be at any time interchanged side for side it is desirable to countersink both sides of the cam at the slot or hole, as has been indicated in the drawing.

While the invention has been described in considerable detail it is to be understood that various changes may be made within the scope of the invention as defined in the appended claims.

I claim:

1. In a device of the character indicated, a disk-like support having a hub thereon, a cam fitting a part of said hub circumferentially, registering holes in said cam and support, said cam having a countersink in the outer surface thereof, a clamp member within said registering holes and having a tapered head fitting a part of said countersink whereby when said clamp member is drawn inwardly said cam will be forced onto said hub, a radial hole in said disk-like support extending from the outer circumferential surface thereof to the hole therein, and a pin threaded in said radial hole and having a tapered end, said clamp member having an opening therein into which said tapered end fits and with one side of which opening it engages whereby when said pin is screwed down said clamp member will be drawn inwardly to urge said cam onto said hub and against said disk-like support.

2. In a device of the character indicated, a cam support, a cam having a hole therethrough on said support, said cam having a countersunk surface, a clamp member having a tapered head fitting said countersunk surface, said clamp member extending through said hole and into an opening in said cam support, and radially extending, radially accessible means for urging said clamp member inwardly in said cam support whereby the tapered head thereon urges said cam sidewise against said cam support and in one direction at right angles thereto.

3. In a device of the character indicated, a cam support, a cam to be secured thereto and having a hole therein, said cam being countersunk at one side of said hole, said cam support having an opening registering with the hole in said cam, a clamp member loosely fitting in the hole through said cam and extending into the opening in said cam support, a tapered head on said clamp member serving to engage the countersunk portion of said cam at one side of the diameter thereof for urging said cam in one direction when said clamp member is forced inwardly, and radially extending, radially accessible wedging means for forcing said clamp member inwardly.

4. In a device of the character indicated, a cam support, a cam to be secured thereon, said cam and support having registering holes, a clamp member in said registering holes and having a head engaging said cam, said support having a peripherally accessible opening therein, and clamp actuating means accessible through said opening for drawing said clamp member inwardly for securing said cam to said cam support.

5. In a device of the character indicated, a supporting disk, a cam to be secured to the face thereof, said cam and disk having registering holes, a clamp member in said registering holes and having a head engaging said cam for securing the same to said support, said supporting disk having a radial opening therein, and means accessible through said radial opening in said cam disk for drawing said clamp member inwardly.

6. In a device of the character indicated, a cam, a cam support, said cam and cam support having registering holes, a clamp member in said registering holes and having a head engaging one of said members, and means in the other of said members accessible through a peripheral opening therein for drawing said clamp member for rigidly securing said members together.

7. In a device of the character indicated, a disk for supporting a cam, a cam to be secured to the face thereof, said cam and disk having registering holes, a clamp member in said registering holes and having a head engaging said cam, said disk having an opening extending from the peripheral surface thereof and communicating with the hole in said disk, and means in said opening and accessible from said peripheral surface and coacting with said clamp member for drawing the same inwardly for securing said cam and disk to each other.

8. In a device of the character indicated, a cam support for supporting a cam having a hole therein, a securing member in said hole to engage said cam, and wedging means accessible through a peripheral opening in said support for engaging said securing member to draw said cam and support together.

9. In a device of the character indicated, a cam support, a cam to be secured thereto, clamping means for clamping said members together, one of said members carrying said clamping means, the other of said members having an open sided hole or slot to engage over said clamping means, and means carried by one of said members and accessible radially through a hole in one of said members for actuating said clamping means.

10. In a device of the character indicated, a gear, a cam to be secured to the side face thereof, a clamping member carried by said gear and projecting from the side face thereof and having a head thereon, a cam to engage the face of said gear and having an open sided hole or slot to engage over said clamping member by moving the same in a direction generally radial of said gear, said head serving to engage the side of said cam, said gear having a peripherally exposed opening therein, and means accessible through said opening for actuating said clamping member, for the purpose described.

11. In a device of the character indicated, a cam support member for supporting a cam, a cam member to be supported flatwise on said support, wedging means to wedge said cam member into engagement with said support, and means movable in a generally radial direction and accessible by means applied peripherally of one of said two first mentioned members for actuating said wedging means.

DONALD H. MONTGOMERY.